(No Model.)

H. DYER.

BAKING PAN.

No. 271,321. Patented Jan. 30, 1883.

WITNESSES:
Fred. G. Dieterich.
N. F. Wallis

Hugh Dyer,
INVENTOR,
by Louis Bagger & Co,
ATTORNEYS

UNITED STATES PATENT OFFICE.

HUGH DYER, OF JOPLIN, MISSOURI.

BAKING-PAN.

SPECIFICATION forming part of Letters Patent No. 271,321, dated January 30, 1883.

Application filed December 9, 1882. (No model.)

*To all whom it may concern:*

Be it known that I, HUGH DYER, of Joplin, in the county of Jasper and State of Missouri, have invented certain new and useful Improvements in Baking-Pans; and I do hereby declare that the following is a full, clear, and exact description thereof, which will enable others skilled in the art to which it appertains to make and use the same, reference being had to the accompanying drawings, which form a part of this specification, and in which—

Figure 1:
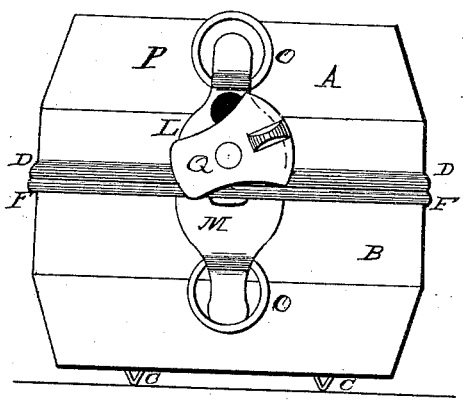
Figure 2:
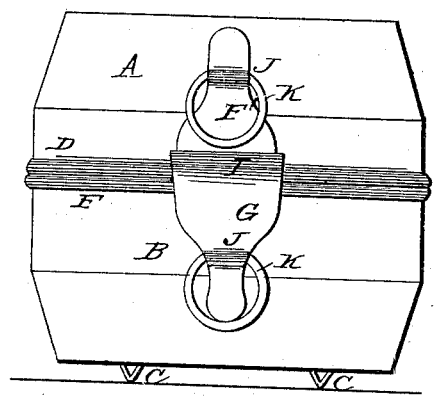
Figure 3:
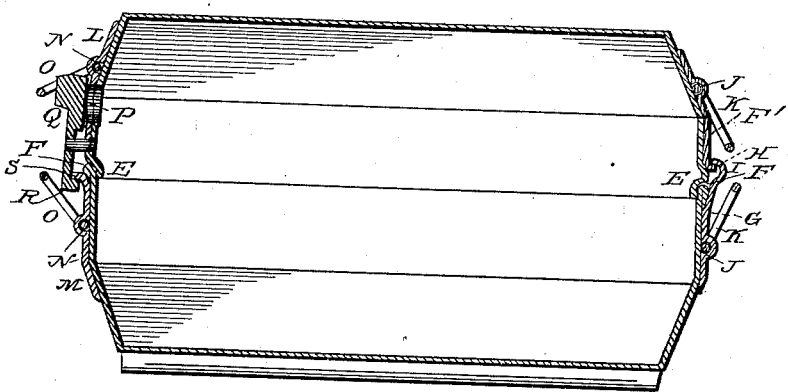

Figure 1 is a front view of my improved baking-pan. Fig. 2 is a rear view; and Fig. 3 a longitudinal sectional view of the same.

Similar letters of reference indicate corresponding parts in all the figures.

My invention has relation to pans for roasting and baking; and it consists in the improved construction and combination of parts of the same, as hereinafter more fully described and claimed.

In the accompanying drawings, the letter A represents the upper and B the lower half of the pan, which is preferably made of sheet metal, seamed or soldered in the corners and contracting or beveled off on all sides at the top and bottom.

Under the bottom are two supports, C C, fastened triangular in cross-section and serving to raise the bottom from the floor of the oven, allowing the air to circulate under it and preventing the burning of the contents.

The lower edge, D, of the upper part of the pan is provided with a beveled bead, E, which bears against the inside of the upper edges, F, of the lower part, B, which allow it to pass down inside them, which forms a tight joint.

At the rear ends of the upper and lower parts of the pan two plates, F' and G, are fastened.

The lower edge, H, of the upper plate is bent outward and the upper edge, I, of the lower plate is bent inward and engage each other, forming a fastening in that end of the pan, while the upper reduced end of the upper plate and the lower reduced end of the lower plate form recesses J J between themselves and the ends of the pans, in which two rings, K K, which serve as handles, are hinged.

Upon the front ends of the parts A and B similar plates, L and M, are fastened, forming similar recesses, N N, for the reception of rings O; but the upper plate has a perforation or aperture, P, which extends through the end of the pan, and which may be closed by a pivoted plate, Q, pivoted upon plate L, and having an inward-bent lip, R, which engages the outward-bent lip, S, of the lower plate, M. The engaging surfaces of these lips are rounded so that they are tightened most when the pivoted plate is in its vertical position. Through the aperture P the contents of the pan may be examined and the aperture cannot be left open, as closing or locking the pan closes the aperture.

Having thus described my invention, I claim and desire to secure by Letters Patent of the United States—

1. In a baking-pan of the described class, the locking device consisting of the two plates L and M, forming recesses N between their outer ends and the ends of the pan for the reception of rings O, and one of them being perforated and having pivoted plate Q, having rounded lip R, adapted to close the aperture P and to engage the rounded lip S of the other plate, substantially as shown and set forth.

2. The baking-pan consisting of the part A, having beveled bead E, lower part, B, having triangular supports C, plates F' and G, having bent edges H and I, and forming recesses J, rings K, plates L, having recess N, aperture P, and pivoted plate Q, having rounded lip R, plate M, having rounded lip S, and rings O, all constructed and combined to operate substantially as and for the purpose shown and set forth.

In testimony that I claim the foregoing as my own I have hereunto affixed my signature in presence of two witnesses.

HUGH DYER.

Witnesses:
CHARLES CARROLL,
WILLIAM CHAPMAN.